United States Patent Office 3,238,068
Patented Mar. 1, 1966

3,238,068
MANUFACTURE OF POROUS NONWETTING ELECTRODES
Allen J. Hipp, Wauwatosa, Wis., assignor to Allis-Chalmers Manufacturing Company, Milwaukee, Wis.
No Drawing. Filed Mar. 7, 1962, Ser. No. 177,984
6 Claims. (Cl. 136—120)

This invention relates generally to fuel cells and more particularly to an improved method of making porous nonwetting electrodes for use in fuel cells.

A major problem in fuel cells employing one or more liquid reagents adjacent the electrode surfaces arises from the tendency of the liquid to permeate the electrode thereby flooding the electrode and choking off its expected action. This is especially a problem in the case of the gaseous fuel cell because of permeation into the electrode structure by the electrolyte, and in the specific case of the hydrogen and oxygen cell, the water formed by the reaction. When such permeation occurs, a phenomenon similar to flooding or choking is achieved whereupon the effective porosity of the electrode is significantly reduced and the functioning of this system attributable to electrode porosity is seriously impaired.

Several efforts have been made in the past to provide electrodes having both optimum gas permeability and wetproofness. The more successful have been extremely costly. For example, one prior art approach employs a powder metallurgical technique and requires careful selection of specially sized raw powders and a critical heat treatment of these powders to form special electrodes.

Another prior art approach directed to an attempt to reduce the cost employs a more conventional electrode form and coats them with a wetproofing agent of paraffin. This approach failed in those reactions where an exothermic heat production caused the paraffin to melt and further where caustic electrolyte actively corroded the wetproofing from the electrode.

Thus, it becomes apparent that a need exists to provide a method of making porous nonwetting electrodes and it is to this end which the present invention is directed.

The present invention is based upon my discovery that by a special pretreatment of the electrode body prior to coating with a specially selected wetproofing material and thereafter sequentially heating the body thus coated, I achieve an action from my preliminary treatment which enables the wetproofing coating to be rendered with the desired degree of porosity and yet remain nonwettable by the electrolyte solution in which it is subsequently immersed. More specific operation that I have in mind will be described in detail hereinafter.

Accordingly, one of the primary objects of the present invention is to make an improved porous nonwetting electrode.

Another object of the present invention is to provide a new electrode structure and a method of providing that structure whereby the structure is rendered easily and readily impermeable by liquids and permeable by gases.

A still further object of the present invention is to make an improved nonwetting electrode in which the porosity of the wetproofing surface may be maintained in a simple and inexpensive way.

A still further object of the present invention is the provision of an improved method of making porous nonwetting electrodes in which the volatility of certain solutions is employed to boil through the wetproofing agent thereby creating the desired porosity.

These and still further objects as shall hereinafter appear are fulfilled by the present invention in a remarkably unexpected fashion as may be discerned from a careful consideration of the following detailed description of an embodiment of this invention.

One form of electrode base which has been found particularly suited to the practice of the present invention is the foraminous or porous nickel electrode base. Accordingly, a foraminous nickel electrode base will be employed in this description to exemplify the nature of the invention although it is of course understood that porous carbon and the other porous electrode base structures now being used in fuel cells may be employed without any diminution of the beneficial effect of the invention.

In one practice of my invention, the porous electrode base which is formed of a dry electrically conductive material such as nickel is submerged into one of my special pretreatment baths containing, for example, a strong solution of ammonium nitrate. The electrode base is left in this bath until it becomes impregnated with the solution. The impregnated electrode base is then dried near room temperature as with an infrared heater or air. The dried impregnated base is then impregnated and coated with an aqueous dispersion of polytetrafluoroethylene, sold under the trade name "Teflon 41BX" (containing approximately 35 percent solids) and one percent "Triton X100" as a wetting agent. "Triton X100" is a trademark for iso-octyl phenoxy polyethoxy ethanol.

The coated and impregnated base is then placed in an oven at room temperature and held there while the Teflon films over. The temperature of the oven is then raised quickly, i.e., in about thirty minutes or less, to 350–380° C., that is, to approximately the sintering temperature of the Teflon solution. While readily ascertainable for a particular solution, it generally will vary between 350–410° C. although most sintering will occur between 350–380° C. The base is maintained in this temperature range for about five minutes.

The quick heating process causes the compound from the initial bath to decompose into its respective gases, for example, $NH_4NO_3$ decomposes into $NH_3$, $NO_2$, NO, $H_2O$.

The gases from the decomposing ammonium nitrate escape from the electrode base and rupture the Teflon film on the surface of the base. After the gases are expelled during the raising of the temperature, the base is maintained in the upper temperature range which causes the film to sinter. The sintered film maintains the pores created by the expelled gaseous phase. In this manner an electrode is created having a foraminous Teflon coating which is porous to gases and yet which is not wettable when employed in an operative fuel cell.

While ammonium nitrate is employed in the above description as the material which in solution is used to impregnate the electrode base as a part of my treating sequence, it should be noted that ammonium nitrate merely exemplifies the type of solution which I use. Any liquid or solubilized solid which is characterized by a propensity to volatilize, decompose, or sublime into a gaseous phase above room temperature (i.e., about 20° C.) but below the sintering temperature of the Teflon solution may be employed in the practice of this invention. Solutions having a vapor pressure of greater than about 1 mm. of mercury at 20° C. may be used but require quicker handling. As a matter of convenience, solutions having a vapor pressure of 1 mm. of mercury or less at 20° C. are to be preferred.

Representative of compounds which are usable in the practice of this invention, and not a limitation thereon, are: ammonium acetate, ammonium benzoate, ammonium carbonate, ammonium carbamate, ammonium perchlorate, ammonium chloride, ammonium citrate, ammonium chloropallodate, ammonium chloroplatinate, ammonium formate, ammonium iodate, ammonium nitrate, ammonium nitrite, ammonium oxalate, ammonium propionate, ammonium sulfide, boric acid, nickel formate, potassium acetate, sodium hydrogen sulfide, sodium nitrite, benzoic acid, sucrose, butyric acid, glycol diacetate dichloroether, triglycol dichloride, butyric anhydride, propylene glycol, 1,2,6 hexanitrol, phenol, dibutyl phthalate, diacetone alcohol, iso-octanol, decyl acrylate, propylene oxide, diamylamine, and tetraethylene pentamine. In addition, I found that iso-octyl phenoxy polyethoxy ethanol (sold by Rohm and Haas Company as "Triton X100" and discussed earlier with regard to the Teflon solution) also provides satisfactory porosity when employed as my pretreatment compound.

It is believed that the foregoing provides ample direction to enable the selection of still further compounds from handbooks now available with no more than ordinary skill being exercised during the perusal of such materials. Accordingly, an all inclusive listing of such compounds is not necessary to the full understanding of my invention inasmuch as any compound which vaporizes, sublimes or decomposes into a gaseous phase between room temperature and about 350–380° C. falls within the spirit of this invention.

From the foregoing it becomes apparent that an improved method of making porous nonwetting electrodes for use in fuel cells has been described which fulfills all of the aforestated objectives to a remarkably unexpected extent.

It is of course understood that such modifications, alterations and applications as may readily occur to the artisan from this disclosure are intended within the spirit hereof, especially as defined by the scope of the claims appended hereto.

What I claim is:

1. A method of making a porous nonwetting electrode for use in fuel cells and the like comprising: immersing an electrically conductive porous electrode base into a first solution containing a compound which is convertible into a gaseous phase at a temperature below 350–380° C.; drying said electrode base with said first solution absorbed therein; coating said dried electrode with polytetrafluoroethylene; holding said coated base at room temperature while said polytetrafluoroethylene films; and rapidly heating said film covered base to the sintering temperature of said film whereupon said compound converts to a gaseous phase which passes out of said base through said film to rupture said film and said film sinters to maintain the porosity created by the rupturing passage of said gaseous phase therethrough.

2. A method of making a porous nonwetting electrode for use in fuel cells and the like comprising: immersing an electrically conductive porous electrode base into a first solution having a vapor pressure of 1 mm. of Hg or less and containing a compound which is convertible into a gaseous phase at a temperature below 350–380° C.; drying said electrode base with said first solution absorbed therein; coating said dried base with a polytetrafluoroethylene solution; drying said coated base at room temperature while said polytetrafluoroethylene films; rapidly heating said film covered base to the sintering temperature of said film whereupon said compound converts to a gaseous phase which passes out of said base through said film to rupture said film and said film sinters to maintain the porosity created by the rupturing passage of said gaseous phase therethrough.

3. A method of making a porous nonwetting electrode for use in fuel cells and the like comprising: immersing an electrically conductive porous electrode base into a first solution containing a compound which is convertible into a gaseous phase at a temperature above room temperature and below 350–380° C.; drying said electrode base with said first solution absorbed therein; coating said dried base with a solution of polytetrafluoroethylene; drying said coated base at room temperature while said polytetrafluoroethylene films; rapidly heating said film covered base to a temperature of about 350–380° C. whereupon said compound converts to a gaseous phase which passes out of said base through said film to rupture said film and said film sinters to maintain the porosity created by the rupturing passage of said gaseous phase therethrough.

4. A method of making a porous nonwetting electrode for use in fuel cells and the like comprising: immersing an electrically conductive porous electrode base into a first solution consisting of materials which are convertible into a gaseous phase at a temperature between room temperature and about 350–380° C.; drying said electrode base with said first solution absorbed in the pores thereof; applying to said dried electrode a coat of a second solution consisting of polytetrafluoroethylene and a wetting agent; drying said coated base at room temperature while said polytetrafluoroethylene films; rapidly heating said film covered base to a temperature of about 350–380° C. whereupon said materials convert to a gaseous phase which passes out of said base through said film to rupture said film and said film sinters to maintain the porosity created by the rupturing passage of said gaseous phase therethrough.

5. A method of making a porous nonwetting electrode for use in fuel cells and the like comprising: immersing an electrically conductive porous electrode base into a solution of ammonium nitrate; drying said electrode base with said ammonium nitrate absorbed therein; coating said dried electrode with a solution containing polytetrafluoroethylene; drying said coated base at room temperature until said polytetrafluoroethylene films; rapidly heating said film covered base to a temperature of 350–380° C. whereupon said ammonium nitrate decomposes into a gaseous phase which passes out of said base through said film to rupture said film and said film sinters to maintain the porosity created by the rupturing passage of said gaseous phase therethrough.

6. A method of making a porous nonwetting electrode for use in fuel cells and the like comprising: immersing an electrically conductive porous electrode base into a solution of ammonium nitrate; drying said electrode base with said ammonium nitrate absorbed therein; coating said dried electrode with a solution containing polytetrafluoroethylene (35 percent solids) and one percent iso-octyl phenoxy polyethoxy ethanol; drying said coated base at room temperature until said polytetrafluoroethylene films; rapidly heating said film covered base to a temperature of 350–380° C. whereupon said ammonium nitrate decomposes into a gaseous phase which passes out of said base through said film to rupture said film and said film sinters to maintain the porosity created by the rupturing passage of said gaseous phase therethrough.

References Cited by the Examiner

UNITED STATES PATENTS

| | | | |
|---|---|---|---|
| 1,624,575 | 4/1927 | Biddle | 136—121.25 |
| 1,836,903 | 12/1931 | Chaney | 136—121.2 |
| 2,207,734 | 7/1940 | Heise et al. | 136—121.1 |
| 2,275,281 | 3/1942 | Berl | 136—121.1 |
| 3,080,440 | 3/1963 | Ruetschi et al. | 136—86 |
| 3,097,974 | 7/1963 | McEvoy et al. | 136—120 |
| 3,098,762 | 7/1963 | Roblee et al. | 136—120 |
| 3,113,048 | 12/1963 | Thompson | 136—120 |

JOHN H. MACK, *Primary Examiner.*

JOHN R. SPECK, *Examiner.*